United States Patent
Oi et al.

(10) Patent No.: US 8,762,402 B2
(45) Date of Patent: Jun. 24, 2014

(54) IN-VEHICLE MEDIA PLAYBACK DEVICE

(75) Inventors: Makoto Oi, Hyogo (JP); Masaharu Tamanaha, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 93 days.

(21) Appl. No.: 13/266,715

(22) PCT Filed: Aug. 27, 2009

(86) PCT No.: PCT/JP2009/004172
§ 371 (c)(1),
(2), (4) Date: Oct. 27, 2011

(87) PCT Pub. No.: WO2011/024225
PCT Pub. Date: Mar. 3, 2011

(65) Prior Publication Data
US 2012/0059835 A1    Mar. 8, 2012

(51) Int. Cl.
*G06F 17/30*       (2006.01)

(52) U.S. Cl.
USPC ............. 707/758; 707/E17.014; 707/E17.101

(58) Field of Classification Search
None
See application file for complete search history.

(56) References Cited

U.S. PATENT DOCUMENTS

2006/0206493 A1*  9/2006  Lipscomb et al. ............. 707/10
2009/0161602 A1   6/2009  Matsumoto

FOREIGN PATENT DOCUMENTS

| JP | 11-289342 A   | 10/1999 |
| JP | 2005-346640 A | 12/2005 |
| JP | 2006-252659 A | 9/2006  |
| JP | 2009-153070 A | 7/2009  |

* cited by examiner

*Primary Examiner* — Anteneh Girma
(74) *Attorney, Agent, or Firm* — Birch, Stewart, Kolasch & Birch, LLP

(57) ABSTRACT

A control unit in a first playback system connected to a musical piece searching unit via a path having the highest data transfer rate includes a determining unit for discriminating between a request for musical piece information from the first playback system and a request for musical piece information from a second playback system, a temporary storage unit for holding data information acquired in response to the request from the second playback system, and a musical piece information transmitting unit for transferring the musical piece information read from the temporary storage unit to the second playback system according to the data transfer rate of a path connecting with the second playback system, and each of the first and second playback systems makes a request of the musical piece searching unit for musical piece information via the control unit, and acquires the data information satisfying the request.

6 Claims, 10 Drawing Sheets

IN-VEHICLE MEDIA PLAYBACK DEVICE

FIELD OF THE INVENTION

The present invention relates to an in-vehicle media playback device which plays back media data about musical pieces or the like by using a plurality of playback systems.

BACKGROUND OF THE INVENTION

For example, in-vehicle media playback devices include a device which has a playback system for front seats and a playback system for rear seats, and which can independently play back media data about musical pieces or the like by using each playback system. As examples in which this device is used, there are a case in which the device plays back musical pieces stored in a single audio CD independently by using the playback system for front seats and the playback system for rear seats, and a case in which the device allows each of the playback system for front seats and the playback system for rear seats to independently select musical pieces from musical pieces stored in a hard disk drive (HDD) device to play back them, respectively.

When a user commands each playback system of the media playback device to play back a musical piece, the playback system stars playing back the musical piece while displaying musical piece information about the musical piece on a display unit such as a display. In many cases, each playback system has also an HMI (Human Machine Interface) function of categorizing all the music names of playbackable musical pieces by artist name and genre name, and displaying them on the screen, and playing back one or more musical pieces which the user has selected on the basis of this display screen, and a search function of, when a music name is inputted by the user, searching for the musical piece having the music name, and playing back the musical piece.

As a conventional technology aimed at increasing the efficiency of the search function of searching for a musical piece, there is a music information distribution device disclosed by patent reference 1, for example. A music information database in which TOC (Table Of Contents) information and musical piece information are stored while they are brought into correspondence with each other and a user database used for determining each user's taste in music are disposed in this music information distribution device. When receiving TOC information, this music information distribution device searches through the music information database for musical piece information associated with the received TOC information, and determines whether or not the data volume of the extracted musical piece information is larger than a maximum transmission capacity.

When determining that the data volume of the musical piece information is smaller than the maximum transmission capacity, the music information distribution device determines that the music information distribution device can afford to transmit other musical piece information or the like, and acquires the user's history information from the user database. The music information distribution device increases the efficiency of the search process of searching for a musical piece by searching for and distributing other musical piece information or the like corresponding to an artist name which the music information distribution device has extracted from the music information database through this search by using this history information. However, the conventional in-vehicle media playback device has the following problems when making each of the plurality of playback systems operate independently.

First, a playback system which is connected to a musical piece information display unit via a communication path having a slow data transfer rate and a limited data volume for each transfer takes a remarkably long time to display musical piece information after the musical piece is specified by the user as compared with other playback systems. A problem with a playback system including a communication path having such a slow data transfer rate as above is that the display's response to the user's operation is bad.

Furthermore, in each playback system, musical piece information which is searched for from the musical piece information database is read into a buffer of a processor which controls the musical piece searching process. This reading process requires much processing time, and the number of times that the playback system performs the reading process also increases dependently upon the contents of the musical piece information. More specifically, various resources, such as a CPU resource of the processor and a resource of a bus, are occupied for a long time while musical piece information is searched for, or a situation in which the execution of another process is blocked and hence the completion of the process is delayed occurs. Therefore, there is a possibility that the response of the whole system to the user's operation gets worse.

For example, in a case in which a conventional in-vehicle media playback system has two playback systems and one of them includes a path having a slower data transfer rate than that of the other playback system, when specification of a musical piece from each of these playback systems occurs at random, the response of the operation of the other playback system also gets worse because of processes carried out by the playback system including the path having a slow data transfer rate.

When a congestion occurs in the two playback systems including paths having different data transfer rates in the conventional in-vehicle media playback system, for example, there is a possibility that in either of various operations an increase in the processing load of the whole system and a delay of the process occur, and the system goes beyond the limit of the response ability to respond to the user's operation.

FIG. 6 is a block diagram showing the structure of a conventional, typical in-vehicle media playback device, and this device has two playback systems each for playing back musical piece data. In FIG. 6, the in-vehicle media playback device 100 has a playback system (system 1) which is controlled by a processor 1, and a playback system (system 2) which is controlled by a processor 2, and a searching operation of searching for a musical piece which is requested to be played back by each of the systems 1 and 2 is controlled by a processor 0.

Each of control units 101a and 101b is a component for performing control computations to implement the HMI of the in-vehicle media playback device 100. The processor 1 executes a control program for the system 1 to embody the control unit 101a which performs processing arithmetic of the HMI for the system 1 as one functional configuration unit of the processor 1. Similarly, the processor 2 executes a control program for the system 2 to embody the control unit 101b which performs processing arithmetic of the HMI for the system 2 as one functional configuration unit of the processor 2. Each of the control units 101a and 101b also carries out a process of transferring data between the control unit and the processor 0.

A musical piece information searching unit 102 is a component for searching for musical piece information through a musical piece DB storage unit 104 in response to a search request to search for the musical piece from each of the control units 101*a* and 101*b* to acquire the musical piece information, and then sending the musical piece information to the control unit which is the source of the request.

The musical piece information searching unit 102 can also be constructed in such a way as to carry out a process of sorting a plurality of musical piece information which are search results. The processor 0 executes a search control program to embody the musical piece information searching unit 102 as one functional configuration unit of the processor 0.

Musical piece playback units 103*a* and 103*b* are components for playing back (decoding) musical piece data read from a musical piece data storage unit 105 according to the musical piece data storage addresses of the musical piece data which are the playback objects specified by the control units 101*a* and 101*b*, respectively. The processor 0 also executes a playback control program to embody each of the musical piece playback units 103*a* and 103*b* as one functional configuration unit of the processor 0. A musical piece data storage address is a storage address of musical piece data in the musical piece data storage unit 105.

In the musical piece DB storage unit 104, a musical piece database (referred to as a musical piece DB from here on) for storing pieces of musical piece information is constructed. In the musical piece DB, pieces of musical piece information are registered systematically. For example, musical piece information is stored in each record of the musical piece DB storage unit 104.

Each piece of musical piece information consists of a plurality of pieces of item information, such as "music name" information, "artist name" information and "genre name" information which are attributes of the musical piece data, and a musical piece data storage address showing the storing position of the musical piece data in the musical piece data storage unit 105. Each of pieces of item information showing the attributes of a musical piece, such as "music name" information, "artist name" information and "genre name" information, is implemented by character string information.

The musical piece data storage unit 105 stores musical piece data. For example, the musical piece data storage unit is constructed on a storage area of a storage unit, such as a CD, a DVD, an HDD, or a USB (Universal Serial Bus) memory. The musical piece DB storage unit 104 and the musical piece data storage unit 105 can be constructed in the same storage medium, or can be constructed in different storage media, respectively.

Each of musical piece information display units 106*a* and 106*b* is a component for displaying musical piece information currently being played back, playbackable musical pieces, etc., and they are installed as a display unit disposed in the in-vehicle media playback device 100. The display processes performed by the musical piece information display units 106*a* and 106*b* are controlled by the control units 101*a* and 101*b*, respectively. Operation units 107*a* and 107*b* are components each for accepting an operational input from outside the in-vehicle media playback device, and output pieces of information inputted thereto through operational inputs to the control units 101*a* and 101*b*, respectively. A user performs an operation of specifying a musical piece which he or she desires the in-vehicle media playback device to play back, forwarding to the next track, starting or stopping a playback, or doing the like by using one of the operation units 107*a* and 107*b*. Sound output units 108*a* and 108*b* are components for generating audio outputs of analog signals of musical piece data whose signal levels are amplified by amplifiers 110*a* and 110*b*, respectively. Each of the sound output units is installed as speakers or a headphone.

A vehicle-mounted network 111 is a communication network which connects among the processor 2, the musical piece information display unit 106*b*, and the operation units 107*b*, and is a low-speed data transfer path which operates in a CAN (Controller Area Network) or the like. More specifically, the vehicle-mounted network 111 is a path having a slower data transfer rate than either of data transfer paths for connecting between the control units 101*a* and 101*b* and the musical piece information searching unit 102, respectively, and a data transfer path for connecting between the network interface of the control unit 101*b* and the vehicle-mounted network 111.

Furthermore, because the vehicle-mounted network 111 has a slower data transfer rate, a transfer of a lot of data using a single packet (each unit for data transfer) increases the time period during which any other data transfer in the vehicle-mounted network 111 is behind schedule, and there is a possibility that the transfer interferes with the operation of each equipment connected to the vehicle-mounted network 111. To solve this problem, in the vehicle-mounted network 111, an upper limit of the data volume which can be transferred by using a single packet is determined in consideration of the data transfer rate to prevent the above-mentioned failure from occurring, and only an individual transfer of each item information of musical piece information by using a single packet is enabled.

In the system 2, even if high-speed data transfer paths are applied as the path for connecting between the processor 2 and the processor 0 (the control unit 101*b* and the musical piece information searching unit 102) and the path for connecting between the vehicle-mounted network 111 and the processor 2 (the vehicle-mounted network 111 and the control unit 101*b*), the efficiency of the data transfer resource gets worse because any data transfer via the vehicle-mounted network 111 is delayed.

Therefore, low-speed data transfer paths are used as the path for connecting between the processor 2 and the processor 0 and the path for connecting between the vehicle-mounted network 111 and the processor 2 in such a way that data transfer operations via the paths are compatible with a data transfer operation via the vehicle-mounted network 111. More specifically, an upper limit of the data volume which can be transferred by using a single packet is determined for each of both the above-mentioned paths, like that determined for the vehicle-mounted network 111, and only an individual transfer of each item information of musical piece information by using a single packet is enabled.

Next, the operation of the conventional in-vehicle media playback device will be explained.

Hereafter, a case in which the musical piece data storage unit 105 stores musical piece data for each track number, and a playback of musical piece data of the same track number "3" is commanded in both the system 1 and the system 2 will be shown as an example.

First, the playback operation of the system 1 will be explained.

FIG. 7 is a timing chart showing the musical piece playback operation of the system 1 in the conventional in-vehicle media playback device. In FIG. 7, the user specifies the track number "3" by using the operation unit 107*a* (1). Information about the operation of specifying the track number "3" is outputted from the operation unit 107*a* to the control unit 101*a*.

When receiving the above-mentioned operation information, the control unit 101*a* makes a request of the musical piece information searching unit 102 for a batch transfer of the musical piece information (2). In the batch transfer, all the pieces of item information ("music name" information, "artist name" information, "genre name" information, and "musical piece data storage address") of the musical piece information are collected into contiguous data, and this data are transferred in a batch as single transfer unit data (a single packet). A "packet" means a unit which occupies a data transfer resource. Furthermore, whether or not the data can be transferred in a batch depends on the data volume on the data transfer path which can be transferred via a single packet.

The control unit 101*a* then adds identification data about its own identification to the data showing the above-mentioned request. As a result, the musical piece information searching unit 102 can identify that the source of the request is the control unit 101*a*.

The musical piece information searching unit 102 searches through the musical piece DB storage unit 104 according to the track number "3" which has been requested by the control unit 101*a*. At this time, if the track number "3" matches the musical piece information of a record 3 in the musical piece DB storage unit 104, the musical piece information searching unit 102 accesses the record 3 of the musical piece DB storage unit 104 (3), and then reads the musical piece information of the record 3 and writes this information into a buffer (not shown in FIG. 6) of the processor 0 (4).

Next, the musical piece information searching unit 102 reads the musical piece information of the record 3 from the above-mentioned buffer, and transfers this musical piece information in a batch to the control unit 101*a* which is the source of the request (5). The control unit 101*a* extracts the musical piece data storage address among the pieces of item information of the musical piece information received from the musical piece information searching unit 102 and specifies the musical piece data storage address for the musical piece playback unit 103*a* while issuing a playback start command (6).

According to the playback start command, the musical piece playback unit 103*a* reads and decodes the corresponding musical piece data from the musical piece data storage unit 105 on the basis of the musical piece data storage address specified by the control unit 101*a*. The decoded musical piece data are outputted from the musical piece playback unit 103*a* to a DA conversion unit 109*a*. The DA conversion unit 109*a* converts the data inputted from the musical piece playback unit 103*a* from a digital signal into an analog signal, and then outputs this analog signal to the amplifier 110*a*. The amplifier 110*a* amplifies the analog signal of the inputted musical piece data, and outputs the amplified analog signal to the sound output unit 108*a*. As a result, an audio output of the musical piece data which the user has specified is produced via the sound output unit 108*a* and a playback of the musical piece data is started.

On the other hand, after issuing the playback start command, the control unit 101*a* promptly carries out a data transfer of the character string information (e.g., the music name information, the artist name information, and the genre name information) of the musical piece information received from the musical piece information searching unit 102 to the musical piece information display unit 106*a* (7). The musical piece information display unit 106*a* displays the character string information of the musical piece information received from the control unit 101*a* on the display screen. The system 1 can thus carry out a playback and a display of the musical piece information of the musical piece specified by the user nearly simultaneously.

Next, the playback operation of the system 2 will be explained.

FIG. 8 is a timing chart of the musical piece playback of the system 2 in the conventional in-vehicle media playback device. In FIG. 8, a user specifies the track number "3" by using the operation unit 107*b* (1). Information about the operation of specifying the track number "3" is outputted from the operation unit 107*b* to the control unit 101*b*.

When receiving the above-mentioned operation information, the control unit 101*b* makes a request of the musical piece information searching unit 102 for individual transfers of the musical piece information (2). In the individual transfers, the pieces of item information (the music name information, the artist name information, the genre name information, and the musical piece data storage address) which construct the musical piece information are transferred via separate packets, respectively. At this time, the control unit 101*b* makes a request for an individual transfer of the musical piece data storage address, among the pieces of item information of the musical piece information corresponding to the track number "3", to the musical piece information searching unit 102.

The musical piece information searching unit 102 searches through the musical piece DB storage unit 104 according to the track number "3" which has been requested by the control unit 101*b*. At this time, if the track number "3" matches the musical piece information of the record 3 in the musical piece DB storage unit 104, the musical piece information searching unit 102 accesses the record 3 of the musical piece DB storage unit 104 (3), and then reads all the pieces of item information of the musical piece information stored in the record 3 and writes all the pieces of item information into the buffer (not shown in FIG. 6) of the processor 0 (4).

Because the path connecting between the control unit 101*b* and the musical piece information searching unit 102 can be used only for individual transfers, as mentioned above, the musical piece information searching unit 102 reads the musical piece data storage address among the pieces of item information of the musical piece information stored in the above-mentioned buffer, and transfers the musical piece data storage address to the control unit 101*b* which is the source of the request (5). The control unit 101*b* specifies the musical piece data storage address received from the musical piece information searching unit 102 for the musical piece playback unit 103*b* while issuing a playback start command (6).

According to the playback start command, the musical piece playback unit 103*b* reads and decodes the corresponding musical piece data from the musical piece data storage unit 105 on the basis of the musical piece data storage address specified by the control unit 101*b*. The decoded musical piece data are outputted from the musical piece playback unit 103*b* to a DA conversion unit 109*b*. The DA conversion unit 109*b* converts the data inputted from the musical piece playback unit 103*b* from a digital signal into an analog signal, and then outputs this analog signal to the amplifier 110*b*. The amplifier 110*b* amplifies the analog signal of the inputted musical piece data, and outputs the amplified analog signal to the sound output unit 108*b*. As a result, an audio output of the musical piece data which the user has specified is produced via the sound output unit 108*b* and a playback of the musical piece data is started.

On the other hand, even after the playback is started, the control unit 101*b* makes a request of the musical piece information searching unit 102 for an individual transfer of the "music name" information of the musical piece information corresponding to the track number "3" (7). The musical piece information searching unit 102 searches through the musical piece DB storage unit 104 according to the track number "3" which has been requested by the control unit 101*b*. Because the track number "3" matches the musical piece information of the record 3 of the musical piece DB storage unit 104, the musical piece information searching unit 102 accesses the record 3 of the musical piece DB storage unit 104 (8), and reads all the pieces of item information of the musical piece information stored in the record 3 and writes them into the buffer of the processor 0 (9).

The musical piece information searching unit 102 then reads the "music name" information from the pieces of item information of the musical piece information stored in the above-mentioned buffer, and transfers the music name information to the control unit 101*b* which is the source of the request (10). The control unit 101*b* transfers the "music name" information received from the musical piece information searching unit 102 to the musical piece information display unit 106*b* via the vehicle-mounted network 111 (11).

Similarly, the control unit 101*b* makes a request of the musical piece information searching unit 102 for an individual transfer of the "artist name" information of the musical piece information corresponding to the track number "3" (12). The musical piece information searching unit 102 searches through the musical piece DB storage unit 104 according to the track number "3" which has been requested by the control unit 101*b*. Because the track number "3" matches the musical piece information of the record 3 of the musical piece DB storage unit 104, the musical piece information searching unit 102 accesses the record 3 of the musical piece DB storage unit 104 (13), and reads all the pieces of item information of the musical piece information stored in the record 3 and writes them into the buffer of the processor 0 (14).

The musical piece information searching unit 102 then reads the "artist name" information from the pieces of item information of the musical piece information stored in the above-mentioned buffer, and transfers the artist name information to the control unit 101*b* which is the source of the request (15). The control unit 101*b* transfers the "artist name" information received from the musical piece information searching unit 102 to the musical piece information display unit 106*b* via the vehicle-mounted network 111 (16).

The musical piece information display unit 106*b* displays the character string information (the music name information and the artist name information) of the musical piece information which the musical piece information display unit has received from the control unit 101*b* via the vehicle-mounted network 111 on the screen. When displaying the "genre name", the control unit 101*b* makes a request of the musical piece information searching unit 102 for an individual transfer of the "genre name" information of the musical piece information corresponding to the track number "3" (17).

The musical piece information searching unit 102 searches through the musical piece DB storage unit 104 according to the track number "3" which has been requested by the control unit 107*b*. Because the track number "3" matches the musical piece information of the record 3 of the musical piece DB storage unit 104, the musical piece information searching unit 102 accesses the record 3 of the musical piece DB storage unit 104 (18), and reads all the pieces of item information of the musical piece information stored in the record 3 and writes them into the buffer of the processor 0 (19).

The musical piece information searching unit 102 then reads the "genre name" information from the pieces of item information of the musical piece information stored in the above-mentioned buffer, and transfers the genre name information to the control unit 101*b* which is the source of the request (20). After that, the control unit 101*b* transfers the "genre name" information received from the musical piece information searching unit 102 to the musical piece information display unit 106*b* via the vehicle-mounted network 111 (21). As a result, the "genre name" is displayed on the screen of the musical piece information display unit 106*b*.

FIG. 9 is a view showing the details of the processing time required for the system 1 to carry out the processing, and that required for the system 2 to carry out the processing in the conventional in-vehicle media playback device. Each processing time in FIG. 9 shows the time which has elapsed until corresponding musical piece information is displayed after the user has specified a track number. Furthermore, in order to compare the processing time of the system 1 with that of the system 2, the processing times shown in the figure are the ones of the systems 1 and 2 each of which is made to operate singly. Each scale of the elapsed time shown in FIG. 9 is equivalent to the transfer time required to transfer a single packet (transfer unit).

In the system 1, each of the process (1) of allowing the user to specify the track number "3", the process (2) of making a request for a batch transfer of the musical piece information which is performed by the control unit 101*a*, and the process (3) of accessing the musical piece DB storage unit 104 in response to the request which is performed by the musical piece information searching unit 102 is completed within a time period which is equal to the transfer time required to transfer a single packet in length. In contrast, the process (4) of reading the musical piece information corresponding to the track number "3" from the musical piece DB storage unit 104, and writing the musical piece information into the buffer, which is performed by the musical piece information searching unit 102, requires a long time. The reason why this process requires a long time is that the process involves physical operations of rotating a storage medium which constructs the musical piece DB storage unit 104, and seeking a desired storage area of the storage medium in addition to the electronic operations of the storage medium.

Because every time when musical piece data are registered as a playback object, musical piece information used for musical piece data search is stored in the musical piece DB, the musical piece DB storage unit 104 has a very large data size as registration of musical piece data is made.

Therefore, a semiconductor memory which does not have a storage capacity sufficient for constructing the musical piece DB is not used as the musical piece DB storage unit 104 while a relatively low cost storage medium capable of storing a large volume of data, such as an HDD, a CD or a DVD, is used as the musical piece DB storage unit 104.

Each of the process (5) of carrying out a batch transfer of the musical piece information corresponding to track number "3" to the control unit 101*a*, which is performed by the musical piece information searching unit 102, the process (6) of specifying the musical piece data storage address for the musical piece playback unit 103*a*, and issuing a playback start command, which is performed by the control unit 101*a*, and the process (7) of transferring the musical piece information to the musical piece information display unit 106*a*, which is performed by the control unit 101*a*, is completed within a time period which is equal to the transfer time required to transfer a single packet in length.

Also in the system 2, each of the process (1) of allowing the user to specify track number "3", the process (2) of making a request for the musical piece data storage address of the musical piece information, which is performed by the control unit 101*b*, and the process (3) of accessing the musical piece DB storage unit 104 in response to the request, which is performed by the musical piece information searching unit 102, is completed within a time period which is equal to the transfer time required to transfer a single packet in length, like in the case of the system 1.

As mentioned above, in the system 2, only individual transfers can be carried out also in the path connecting between the control unit 101b and the musical piece information searching unit 102. Therefore, the control unit 101b makes a request of the musical piece information searching unit 102 for a transfer of each piece of item information of the musical piece information.

However, because the musical piece information searching unit 102 carries out data reading of each record information of the musical piece DB storage unit 104, the musical piece information searching unit carries out the process (4) of reading all the pieces of item information of the musical piece information and writing them into the buffer even when a request for an individual transfer is made by the control unit 101b. More specifically, the musical piece information searching unit repeatedly carries out the processes (4), (9), (14), and (19) of reading all the pieces of item information of the musical piece information stored in the same record whose number is equal to the number of pieces of item information to be displayed on the screen of the musical piece information display unit 106b, and writing them into the buffer.

Furthermore, when performing a playback process of playing back a musical piece medium, the conventional in-vehicle media playback device can list the music name of a musical piece playbackable the next time in addition to the music name of the musical piece currently being played back. Also in this case, such an increase in the processing load and in the processing time as mentioned above occurs in the system 2.

FIG. 10 is a timing chart of a process of displaying the music names of a plurality of musical piece data in the system 2 of the conventional in-vehicle media playback device. As shown in FIG. 10, every time when the control unit 101b makes a request of the musical piece information searching unit 102 for acquisition of "music name" information stored in each of records 1 to 4, the musical piece information searching unit 102 reads the musical piece information from the musical piece DB storage unit 104 in units of one record. More specifically, the musical piece information searching unit repeatedly carries out a process of reading all the pieces of musical piece information from the musical piece DB storage unit 104 whose number is equal to the number of "music names" to be displayed on the screen of the musical piece information display unit 106b.

A problem with the conventional in-vehicle media playback device is thus that the processing time of the system 2 becomes remarkably long compared with that of the system 1, and the response of display of musical piece information to the user's operation is very bad.

Furthermore, when a long-time process, such as a process of reading and writing musical piece information into the buffer, is carried out two or more times, various resources including the CPU resource of each processor and the resource of the bus are occupied for a long time, or a situation in which the execution of another process is blocked and the completion of this process is delayed occurs. Therefore, the response of the whole system to the user's operation gets worse.

In addition, when specification of a musical piece from the system 1 or 2 occurs at random, the response of the operation of the system 1 also gets worse due to the processing carried out by the system 2. Conventionally, when congestion occurs in the systems 1 and 2, there is a possibility that any of various operations causes an increase in the processing load of the whole system and a processing delay, and the response ability to respond to the user's operation reaches its limit.

For example, in a case in which the musical piece DB storage unit 104 and the musical piece data storage unit 105 are constructed on the same storage medium, a conflict may occur between the process of reading record information of the musical piece DB and the process of reading musical piece data. In this case, a problem is that a delay occurs in the process of reading musical piece data, and the time required to start a playback of a musical piece after the user has specified this musical piece is lengthened.

In order to solve the above-mentioned problem, there can be considered a method of making the musical piece information searching unit 102 individually read musical piece information in units of not each record, but each information which constructs the musical piece information. However, an advantage of shortening the processing time is not provided for the following reasons.

First, in a storage medium in which the musical piece DB storage unit 104 is constructed, such as an HDD, a CD or a DVD, data reading is carried out per sector. For example, in the case of an HDD in which each sector is 512 bytes in size, physical data reading is carried out in units of one sector, i.e. 512 bytes.

Furthermore, the total data size occupied by one musical piece information (the size of one record) usually falls within one sector. Therefore, even if the musical piece information searching unit tries to read each item information of musical piece information individually, the resultant data volume read from the medium does not differ from that in the case in which the musical piece information is read in a batch.

There can be considered a method of newly disposing a reading unit of reading information in units of a smaller amount of data (e.g. one sector or less) in order to read each item information of musical piece information individually.

However, because physical data reading is indispensable in the above-mentioned storage medium, a significant shortening of the processing time cannot be expected as compared with the case in which musical piece information is read out in a batch even if the above-mentioned reading unit is disposed.

The above-mentioned problem is specific to reading of data from the musical piece DB storage unit 104 and a playback device including a data transfer path like the vehicle-mounted network 111, and simple use of the method of improving the efficiency of the data transfer resources described in the patent reference 1 cannot solve the problem.

The present invention is made in order to solve the above-mentioned problem, and it is therefore an object of the present invention to provide an in-vehicle media playback device which reduces the frequency of access to a musical piece database to reduce the processing load thereon and the operation delay occurring therein, thereby being able to improve the ability of response to a user's operation of specifying a playback object.

RELATED ART DOCUMENT

Patent Reference

Patent reference 1: Japanese Unexamined Patent Application Publication No. 2005-346640

SUMMARY OF THE INVENTION

In accordance with the present invention, there is provided an in-vehicle media playback device including a searching unit for searching for data information satisfying a request from a first storage unit for storing data information specifying media data, and a plurality of playback systems each having a playback unit for reading media data from a second storage unit for storing the media data according to the data information, and playing back the media data, a presenting unit for presenting data information about the media data, and a control unit for making a request of the searching unit for data information about media data which is a playback object, in which the control unit in one of the plurality of playback systems which is connected to the searching unit via a path having a highest data transfer rate includes: a receiving unit for receiving a request for data information from another playback system; a determining unit for discriminating between a request for data information from the playback system to which the determining unit belongs, and the request for data information from the other playback system received by the receiving unit; a data holding unit for holding data information acquired by the searching unit in response to the request from the other playback system; and a transmitting unit for data-transferring the data information satisfying the request from the other playback system which is read from the data holding unit to the other playback system according to a data transfer rate of a path connecting with the other playback system, and in which each of the plurality of playback systems makes a request of the searching unit for data information via the control unit which is connected to the searching unit via the path having the highest data transfer rate, and acquires data information satisfying the request.

According to the present invention, the control unit in one of the plurality of playback systems which is connected to the searching unit via a path having a highest data transfer rate includes the receiving unit for receiving a request for data information from another playback system; the determining unit for discriminating between a request for data information from the playback system to which the determining unit belongs, and the request for data information from the other playback system received by the receiving unit, the data holding unit for holding data information acquired by the searching unit in response to the request from the other playback system, and the transmitting unit for data-transferring the data information satisfying the request from the other playback system which is read from the data holding unit to the other playback system according to the data transfer rate of the path connecting with the other playback system, and in which each of the plurality of playback systems makes a request of the searching unit for data information via the control unit which is connected to the searching unit via the path having the highest data transfer rate, and acquires data information satisfying the request. Because the in-vehicle media playback device is constructed in this way, the in-vehicle media playback device can improve its response ability to a user's operation of specifying a playback object.

EMBODIMENTS OF THE INVENTION

Hereafter, in order to explain this invention in greater detail, the preferred embodiments of the present invention will be described with reference to the accompanying drawings.

Embodiment 1

An in-vehicle media playback device in accordance with the present invention includes a plurality of playback systems each for playing back media data, and a searching unit for searching through a storage unit which stores data information specifying media data which is a playback object to acquire data information of media data satisfying a request from a playback system, and, when making this search, carries out a transfer of information which is exchanged between each of the plurality of playback system and the searching unit by selectively using only a path having the highest data transfer rate among paths connecting between the searching unit and the playback systems.

Furthermore, in this embodiment, an in-vehicle media playback device which plays back musical piece data as media data, and is provided with two playback systems: a playback system for front seats in a vehicle (system 1), and a playback system for rear seats in the vehicle (system 2) will be explained as an example. The present invention can also be applied to an in-vehicle media playback device including three or more playback systems.

In addition, a storage medium for storing musical piece data (media data) can be a CD or a DVD. A user specifies a track number of this storage medium to command the in-vehicle media playback device to play back the track number. As a result, the in-vehicle media playback device plays back the musical piece of the track number specified by the user while displaying musical piece information (the music name, the artist name and the genre name) (data information) about the musical piece currently being played back on the screen of a display unit.

Figure 1:
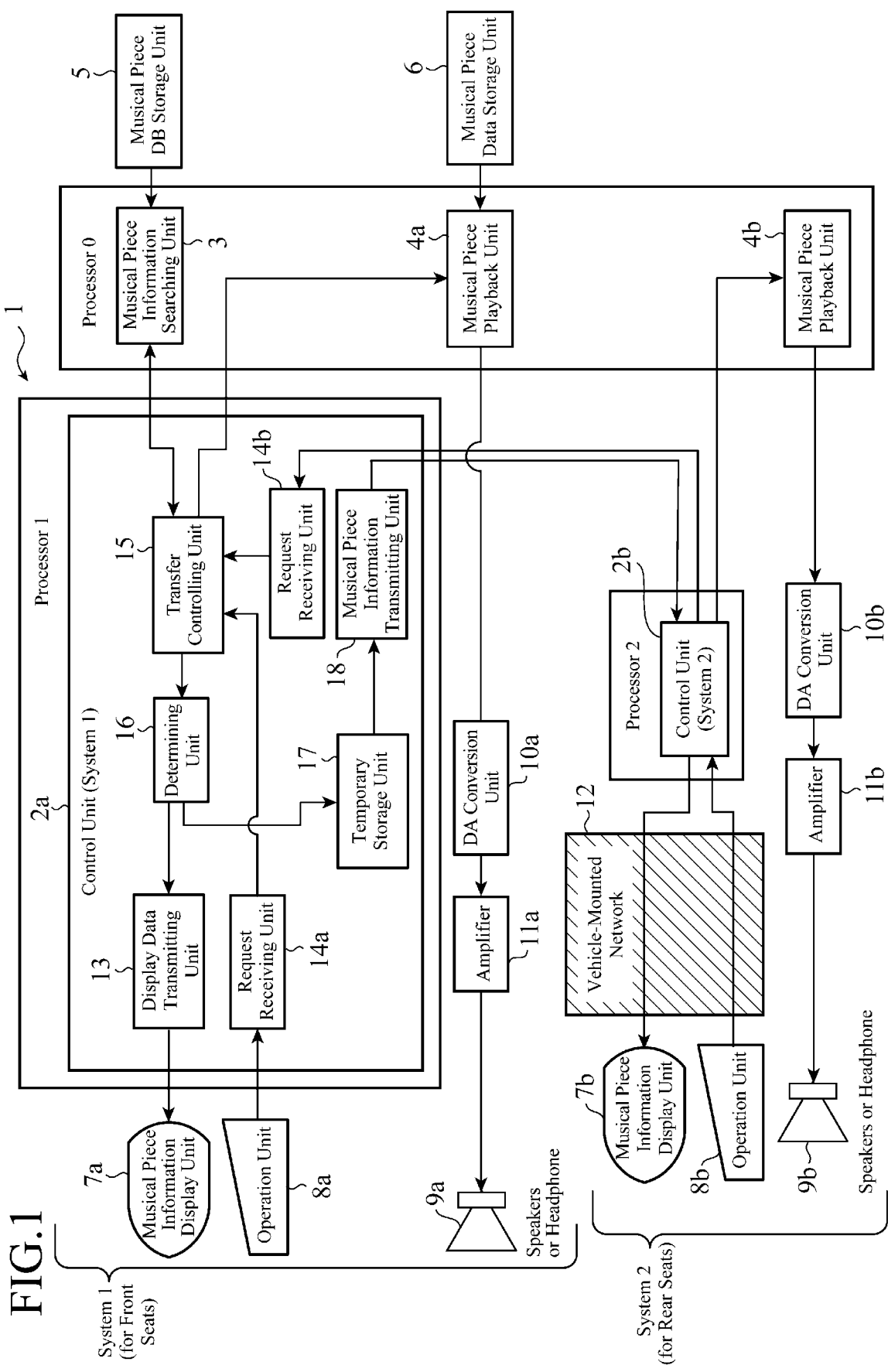
FIG. 1 is a block diagram showing the structure of an in-vehicle media playback device in accordance with Embodiment 1 of the present invention.

FIG. 1 is a block diagram showing the structure of the in-vehicle media playback device in accordance with Embodiment 1 of the present invention. In FIG. 1, the in-vehicle media playback device in accordance with Embodiment 1 has the playback system (system 1) which is controlled by a processor 1, and the playback system (system 2) which is controlled by a processor 2, and a searching operation of searching for a musical piece which is requested to be played back by each of the systems 1 and 2 is controlled by a processor 0.

Each of control units 2a and 2b is a component for performing control computations to implement an HMI of the in-vehicle media playback device 1. The processor 1 executes a control program for the system 1 to embody the control unit 2a which performs processing arithmetic of the HMI for the system 1 as one functional configuration unit of the processor 1. The processor 2 executes a control program for the system 2 to embody the control unit 2b which performs processing arithmetic of the HMI for the system 2 as one functional configuration unit of the processor 2.

Furthermore, the control unit 2a is provided with a display data transmitting unit 13, request receiving units 14a and 14b, a transfer controlling unit 15, a determining unit 16, a temporary storage unit (data holding unit) 17, and a musical piece information transmitting unit 18. The processor 1 executes the control program for the system 1 to embody each of the display data transmitting unit 13, the request receiving units (receiving units) 14a and 14b, the transfer controlling unit 15, the determining unit 16, and the musical piece information transmitting unit (transmitting unit) 18 as a functional configuration unit of the control unit 2a. The temporary storage unit 17 is implemented by using a RAM (Random Access Memory) or the like disposed in the processor 1.

The display data transmitting unit 13 is a component for transmitting display data to be transferred to a musical piece information display unit 7a of the system 1. As display data, there is character string information of pieces of item information (a music name, an artist name and a genre name) showing the attributes of a musical piece in musical piece information (data information). The request receiving unit 14a is a component for receiving data showing operation information inputted by an operation unit 8a. The request receiving unit 14b is a component for receiving data showing a musical piece information acquisition request from the control unit 2b of the system 2.

The transfer controlling unit 15 is a component for controlling data transmission and reception between the control unit 2a and each of the processors 0 and 2 while controlling data transmission and reception between the control unit 2a and each of the operation unit 8a and the musical piece information display unit 7a disposed in the system 1. The determining unit 16 is a component for determining whether the musical piece information acquired from the musical piece information searching unit 3 via the transfer controlling unit 15 is a response to a request from either one of the systems 1 and 2.

Which one of the systems 1 and 2 is the source of a request is determined as follows, for example.

First, when transmitting data showing a request for acquisition of musical piece information, the control unit 2b adds identification data for identifying the system to which the control unit belongs to the above-mentioned data. The transfer controlling unit 15 determines whether the inputted request is either a request from the operation unit 8a of the system 1 or a request from the control unit 2b of the system 2 according to the identification data.

Furthermore, when making a request of the musical piece information searching unit 3 for acquisition of musical piece information, the transfer controlling unit 15 similarly adds identification data about the system to which the transfer controlling unit belongs to data about this request, and transmits the data to the musical piece information searching unit 3.

When searching through the musical piece DB storage unit 5 to acquire the musical piece information satisfying the request, the musical piece information searching unit 3 operates after grasping that one of the systems 1 and 2 is the source of the request according to the above-mentioned identification data. More specifically, when transferring musical piece information to each of the control units 2a and 2b of the systems 1 and 2, the musical piece information searching unit 3 transmits the musical piece information after adding the identification data about the system which is the destination to the musical piece information data.

When the musical piece information data from the musical piece information searching unit 3 is inputted to the determining unit 16 via the transfer controlling unit 15, the determining unit 16 determines whether the musical piece information is a response to a request from either one of the systems 1 and 2 according to the identification data included in this musical piece information data.

The temporary storage unit 17 temporarily stores the musical piece information to be transferred to the control unit 2b of the system 2. Because a data transfer from the musical piece information searching unit 3 to the control unit 2a of the system 1 is a batch transfer and a data transfer from the control unit 2a to the control unit 2b of the system 2 is an individual transfer, the temporary storage unit 17 functions as a buffer which absorbs the difference between their transfer times.

The musical piece information transmitting unit 18 is a component for transferring the musical piece information read from the temporary storage unit 17 to the control unit 2b of the system 2. Because the transfer path between the control unit 2a and the control unit 2b has a slow data transfer rate, the musical piece information transmitting unit 18 transmits each item information of the musical piece information to the control unit 2b through an individual transfer.

The musical piece information searching unit (searching unit) 3 is a component for searching through the musical piece DB storage unit 5 to acquire musical piece information in response to a request to search for the musical piece from each of the control units 2a and 2b and send the musical piece information back to the source of the request. The processor 0 executes a search control program to embody the musical piece information searching unit 3 as one functional configuration unit of the processor 0.

Each of the musical piece playback units (playback units) 4a and 4b is a component for playing back (decoding) the musical piece data read from the musical piece data storage unit 6 according to the musical piece data storage address of the musical piece data which is a playback object specified by the corresponding one of the control units 2a and 2b. The musical piece data storage address shows the storing position of the musical piece data in the musical piece data storage unit 6. The processor 0 also executes a playback control program to embody each of the musical piece playback units 4a and 4b as one functional configuration unit of the processor 0.

In the musical piece DB storage unit 5, a musical piece DB is constructed. In the musical piece DB, pieces of musical piece information are registered systematically and musical piece information is stored in each record of the musical piece DB storage unit 5.

Furthermore, each musical piece information is constructed of a plurality of pieces of item information, such as "music name" information, "artist name" information and "genre name" information which show the attributes of the corresponding musical piece data, and a musical piece data storage address showing the storing position of the musical piece data in the musical piece data storage unit 6, and can be used as data information for determining musical piece data which is a playback object. Each item information, such as "music name" information, "artist name" information or "genre name" information, is implemented as character string information.

The musical piece data storage unit 6 stores musical piece data. For example, the musical piece data storage unit is constructed on a storage area of a storage unit, such as a CD, a DVD, an HDD, or a USB memory. The musical piece DB storage unit 5 and the musical piece data storage unit 6 can be constructed in the same storage medium, or can be constructed in different storage media, respectively.

Each of the musical piece information display unit (presentation unit) 7a and a musical piece information display unit (presentation unit) 7b is a component for displaying musical piece information of a musical piece currently being played back or a playbackable musical piece, and so on, and are installed as a display unit disposed in the in-vehicle media playback device 1. Display processes performed by the musical piece information display units 7a and 7b are controlled by the control units 2a and 2b, respectively.

Each of the operation unit 8a and an operation unit 8b is a component for accepting an operational input from outside the in-vehicle media playback device, and pieces of information inputted thereto through operational inputs to the operational units 8a and 8b are outputted to the control units 2a and 2b, respectively. A user performs an operation of specifying a musical piece which he or she desires the in-vehicle media playback device to play back, forwarding to the next track, starting or stopping a playback, or doing the like by using one of the operation units 8a and 8b. Sound output units 9a and 9b are components for producing audio outputs of analog signals of musical piece data whose signal levels are amplified by amplifiers 11a and 11b, respectively. Each of the sound output units is installed as speakers or a headphone. A vehicle-mounted network 12 is a communication network which connects among the processor 2, the musical piece information display unit 7b, and the operation unit 8b.

Figure 2:
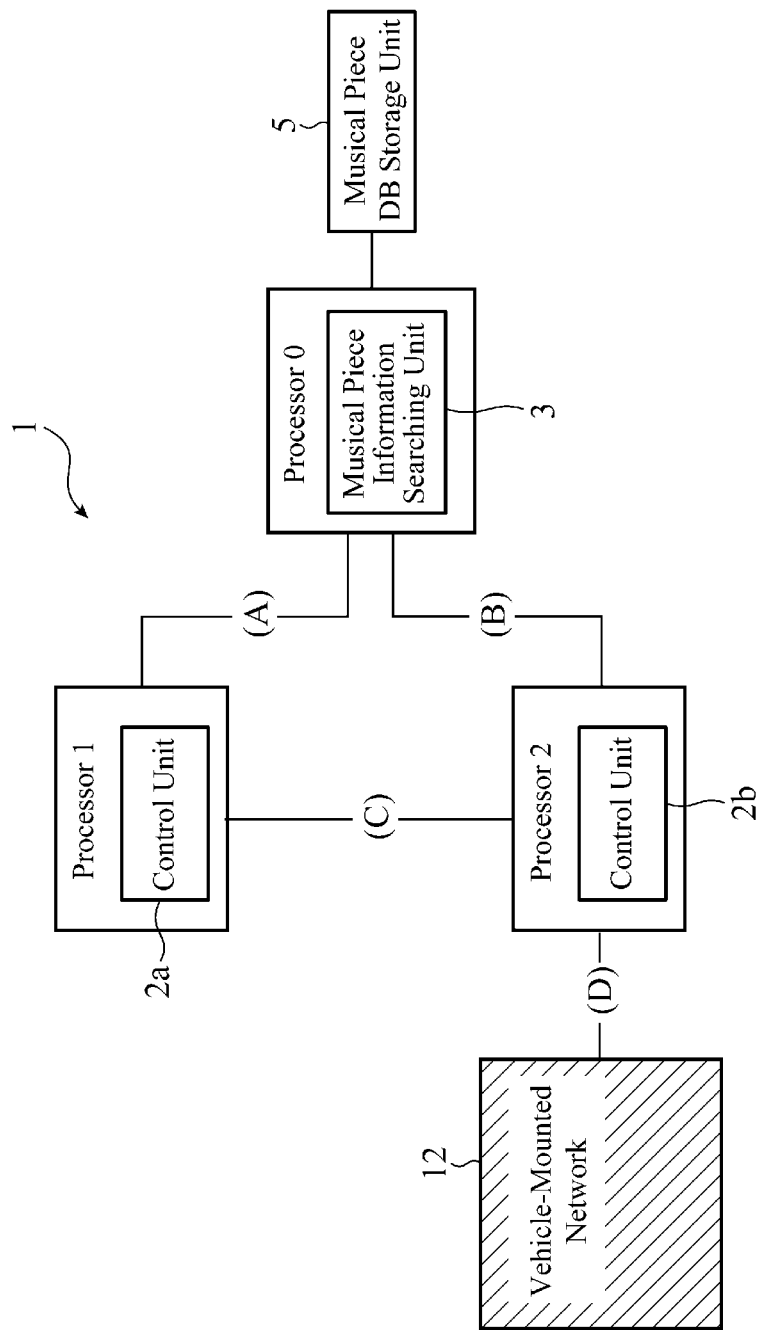
FIG. 2 is a view showing data transfer paths disposed among processors of the in-vehicle media playback device in accordance with Embodiment 1.
Figure 6:
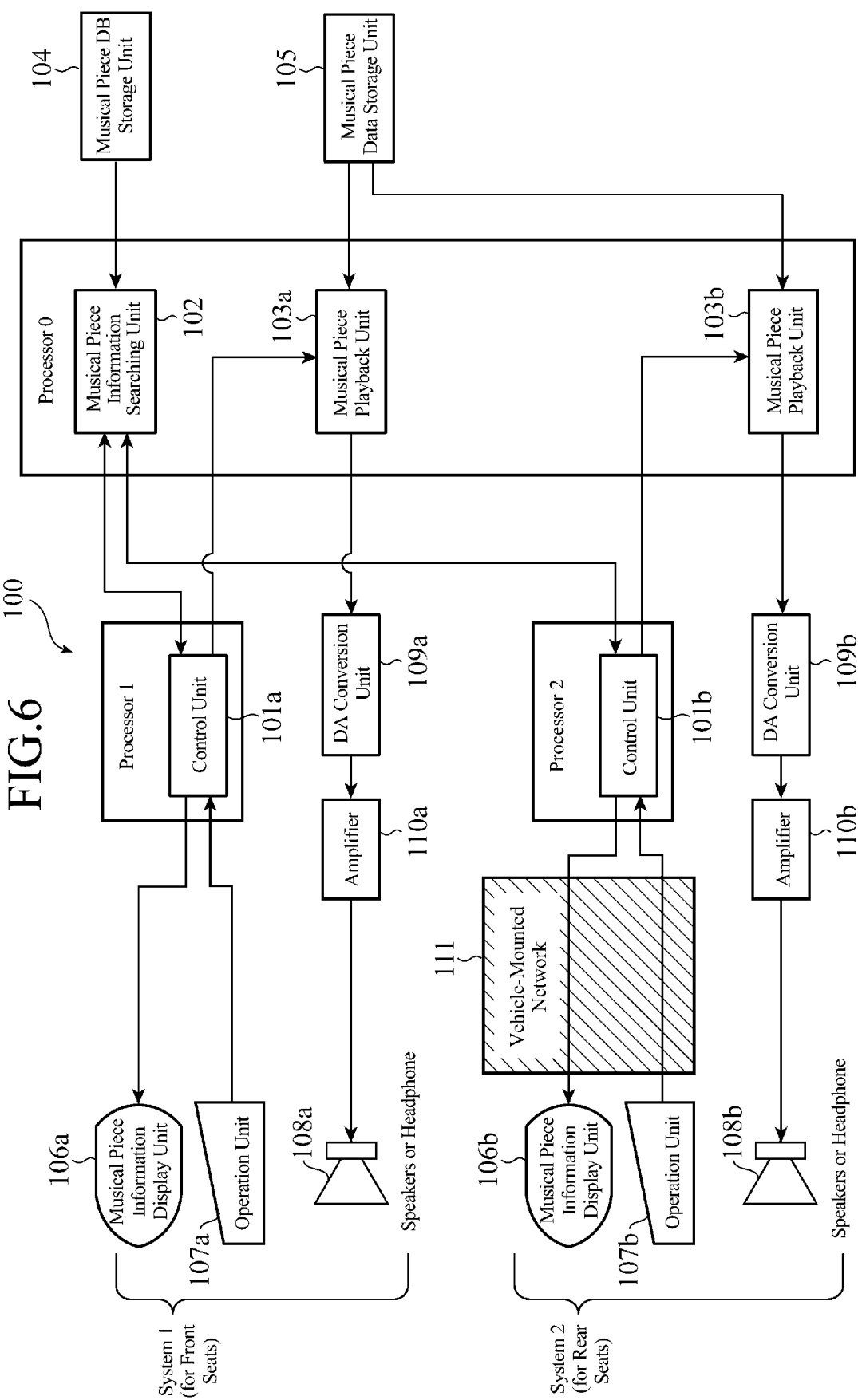
FIG. 6 is a block diagram showing the structure of a conventional, typical in-vehicle media playback device.
Figure 7:
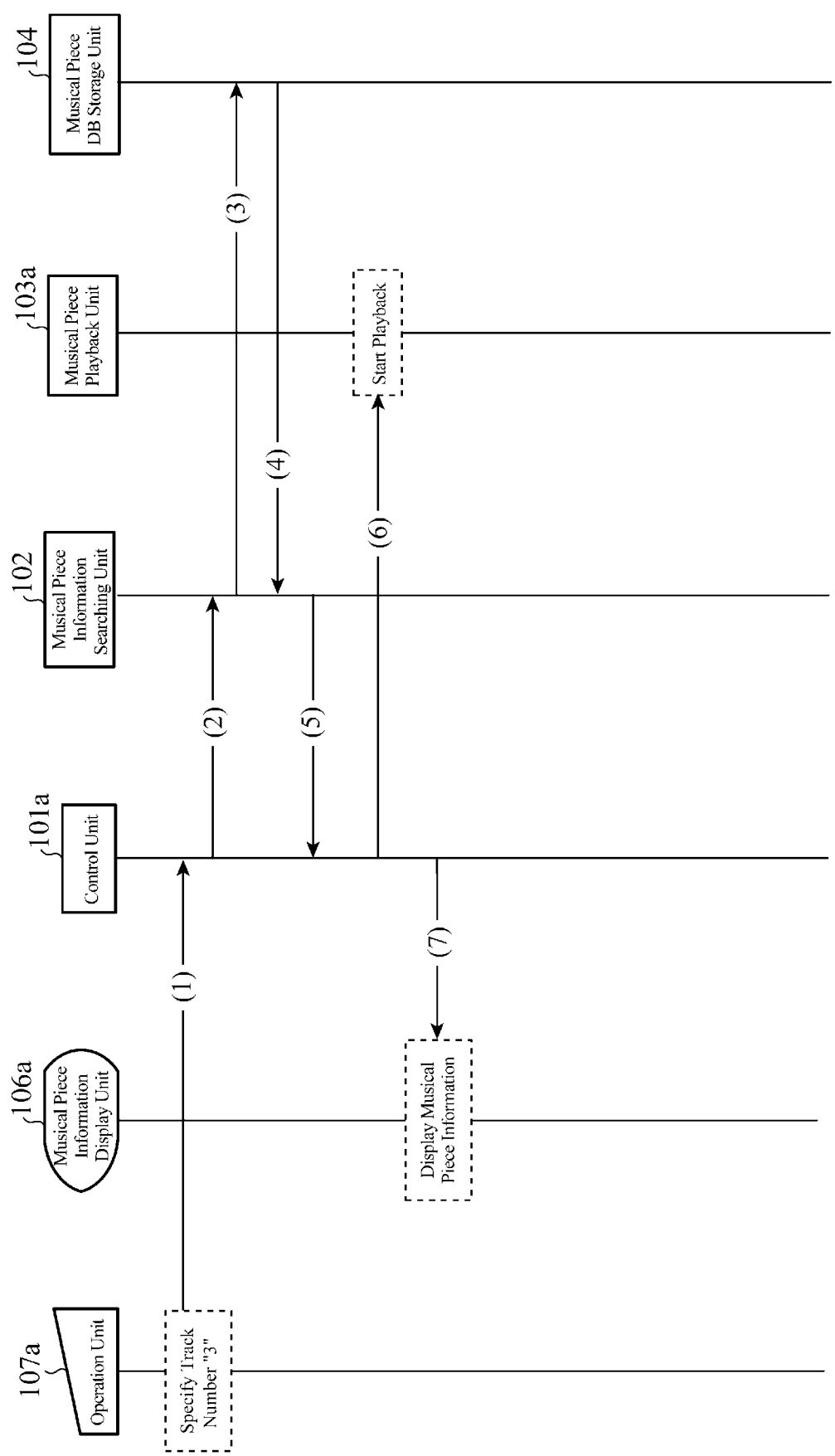
FIG. 7 is a timing chart of a musical piece playback of a system 1 in the conventional in-vehicle media playback device.
Figure 8:
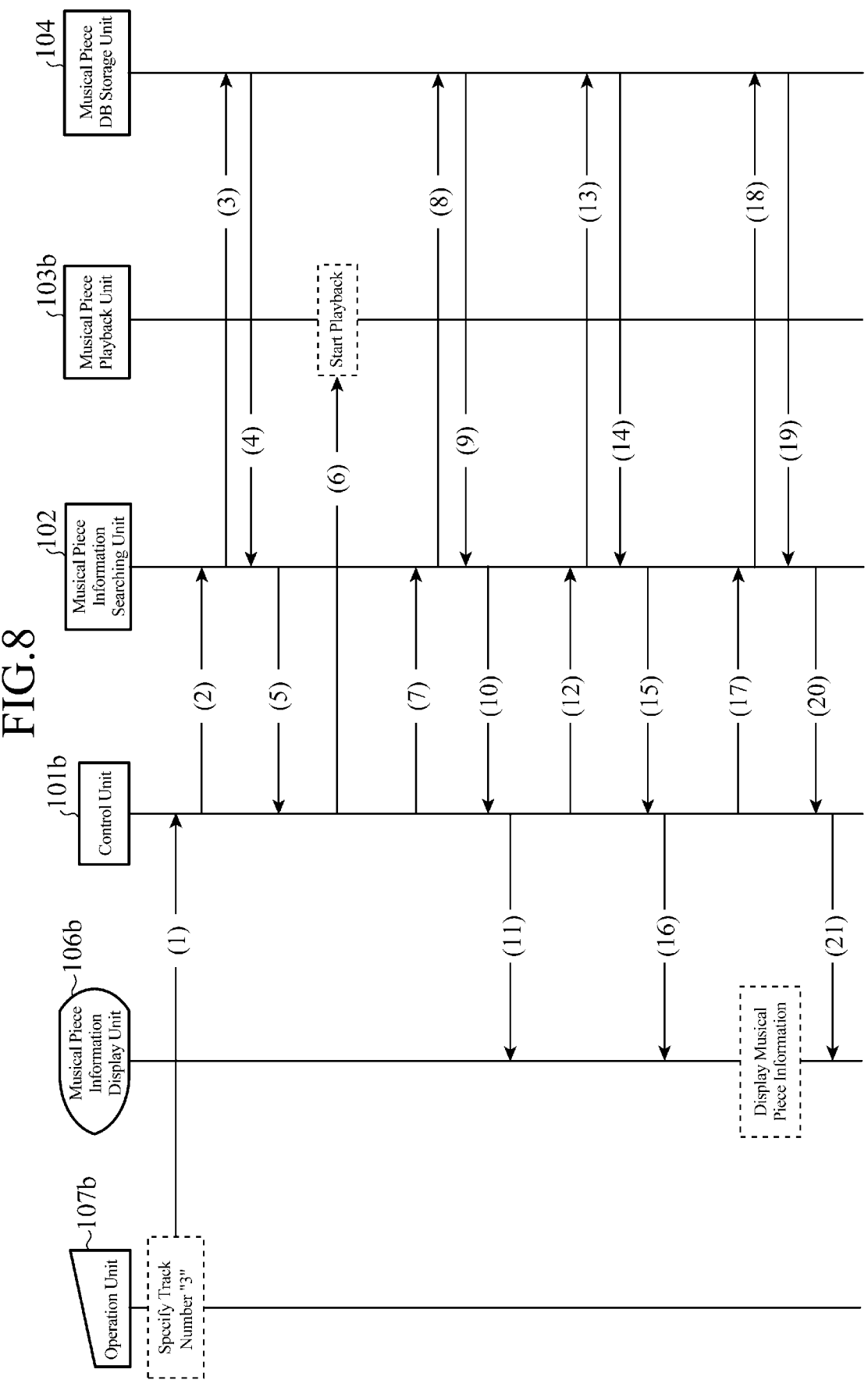
FIG. 8 is a timing chart of a musical piece playback of a system 2 in the conventional in-vehicle media playback device.

FIG. 2 is a view showing data transfer paths disposed among the processors of the in-vehicle media playback device in accordance with Embodiment 1. The in-vehicle media playback device 1 in accordance with Embodiment 1 uses data transfer paths (paths (A), (B) and (D)) disposed in a conventional device shown in FIG. 6, just as they are, and newly includes a path (C) for connecting between the control unit 2a of the processor 1 and the control unit 2b of the processor 2 (a path for connecting between the control unit of each of the playback systems).

There is no path which delays a data transfer, like the vehicle-mounted network 12, in the system 1 controlled by the control unit 2a. Therefore, a relatively high cost path having a fast data transfer rate is used as the path (A) which connects between the processor 0 and the processor 1 (between the musical piece information searching unit 3 and the control unit 2a). As a result, the path (A) has a large volume of data which can be transferred via a single packet, and makes it possible for the in-vehicle media playback device to perform a batch transfer operation of transferring all pieces of item information of musical piece information via a single packet.

In contrast, the system 2 controlled by the control unit 2b has the vehicle-mounted network 12 having a slow data transfer rate. Therefore, because when the in-vehicle media playback device performs a process of displaying the musical piece information from the musical piece DB storage unit 5 on the screen of the musical piece information display unit 7b, the data transfer is delayed in the vehicle-mounted network 12, the efficiency of the data transfer resource gets worse in case in which each of the paths (B), (C), and (D) is a high-speed one.

The processor 2 also functions as a gateway with the vehicle-mounted network 12 with respect to each of the processor 0 and the processor 1. Therefore, each of a data transfer from the processor 0 to the processor 1, a data transfer from the processor 2 to the processor 1, and a data transfer from the processor 2 to the vehicle-mounted network 12 has only to be performed within the limit of a communication capability equivalent to that of the vehicle-mounted network 12, while it is preferable that a transfer path having a better communication capability than the vehicle-mounted network 12 is not used as each of the paths (B) and (C), and, in this case, the data transfer resource can be used efficiently.

Therefore, in the system 2, each of the paths (B), (C) and (D) is constructed of a low-cost slow-data-transfer-rate path whose data volume which can be transferred via a single packet is smaller than that of the path (A).

In this embodiment, like in the case of the vehicle-mounted network 12, an upper limit is provided for the data volume which can be data-transferred via a single packet, and each of the paths (B) to (D) is constructed of a path via which only an individual transfer operation of transferring, via a single packet, each of pieces of item information ("music name" information, "artist name" information, "genre name" information, and a "musical piece data storage address") of musical piece information is enabled.

Next, the operation of the in-vehicle media playback device will be explained.

Hereafter, a case in which the musical piece data storage unit 6 stores musical piece data for each track number, and a playback of musical piece data about the same track number "3" is commanded by each of the system 1 and the system 2 will be shown as an example.

First, the playback operation of the system 1 will be explained.

A user specifies the track number "3" by using the operation unit 8a (1). Information about this operation is outputted from the operation unit 8a to the control unit 2a.

When receiving the above-mentioned operation information, the control unit 2a makes a request of the musical piece information searching unit 3 for a batch transfer of the musical piece information (2). In the batch transfer, all the pieces of item information ("music name" information, "artist name" information, "genre name" information, and "musical piece data storage address") of the musical piece information are collected into contiguous data, and this data are transferred in a batch as single transfer unit data (a single packet).

The musical piece information searching unit 3 searches through the musical piece DB storage unit 5 according to the track number "3" which has been requested by the control unit 2a. At this time, if the track number "3" matches the musical piece information of a record 3 of the musical piece DB storage unit 5, the musical piece information searching unit 3 accesses the record 3 of the musical piece DB storage unit 5 (3), and reads the musical piece information stored in the record 3 and writes this information into a buffer (not shown in FIG. 1) of the processor 0 (4).

Next, the musical piece information searching unit 3 reads the musical piece information of the record 3 from the above-mentioned buffer, and transfers this musical piece information in a batch to the control unit 2a which is the source of the request (5). The control unit 2a extracts the musical piece data storage address among the pieces of item information of the musical piece information received from the musical piece information searching unit 3 and specifies the musical piece data storage address for the musical piece playback unit 4*a* while issuing a playback start command (6).

According to the playback start command, the musical piece playback unit 4*a* reads and decodes the corresponding musical piece data from the musical piece data storage unit 6 on the basis of the musical piece data storage address specified by the control unit 2*a*. The decoded musical piece data are outputted from the musical piece playback unit 4*a* to a DA conversion unit 10*a*. The DA conversion unit 10*a* converts the data inputted from the musical piece playback unit 4*a* from a digital signal into an analog signal, and then outputs this analog signal to the amplifier 11*a*. The amplifier 11*a* amplifies the analog signal of the inputted musical piece data, and outputs the amplified analog signal to the sound output unit 9*a*. As a result, an audio output of the musical piece data which the user has specified is produced via the sound output unit 9*a* and a playback of the musical piece data is started.

On the other hand, after issuing the playback start command, the control unit 2*a* promptly carries out a data transfer of the character string information (e.g., the music name information, the artist name information, and the genre name information) of the musical piece information received from the musical piece information searching unit 3 to the musical piece information display unit 7*a* (7). The musical piece information display unit 7*a* displays the character string information of the musical piece information received from the control unit 2*a* on the display screen.

Next, the playback operation of the system 2 will be explained.

Figure 3:
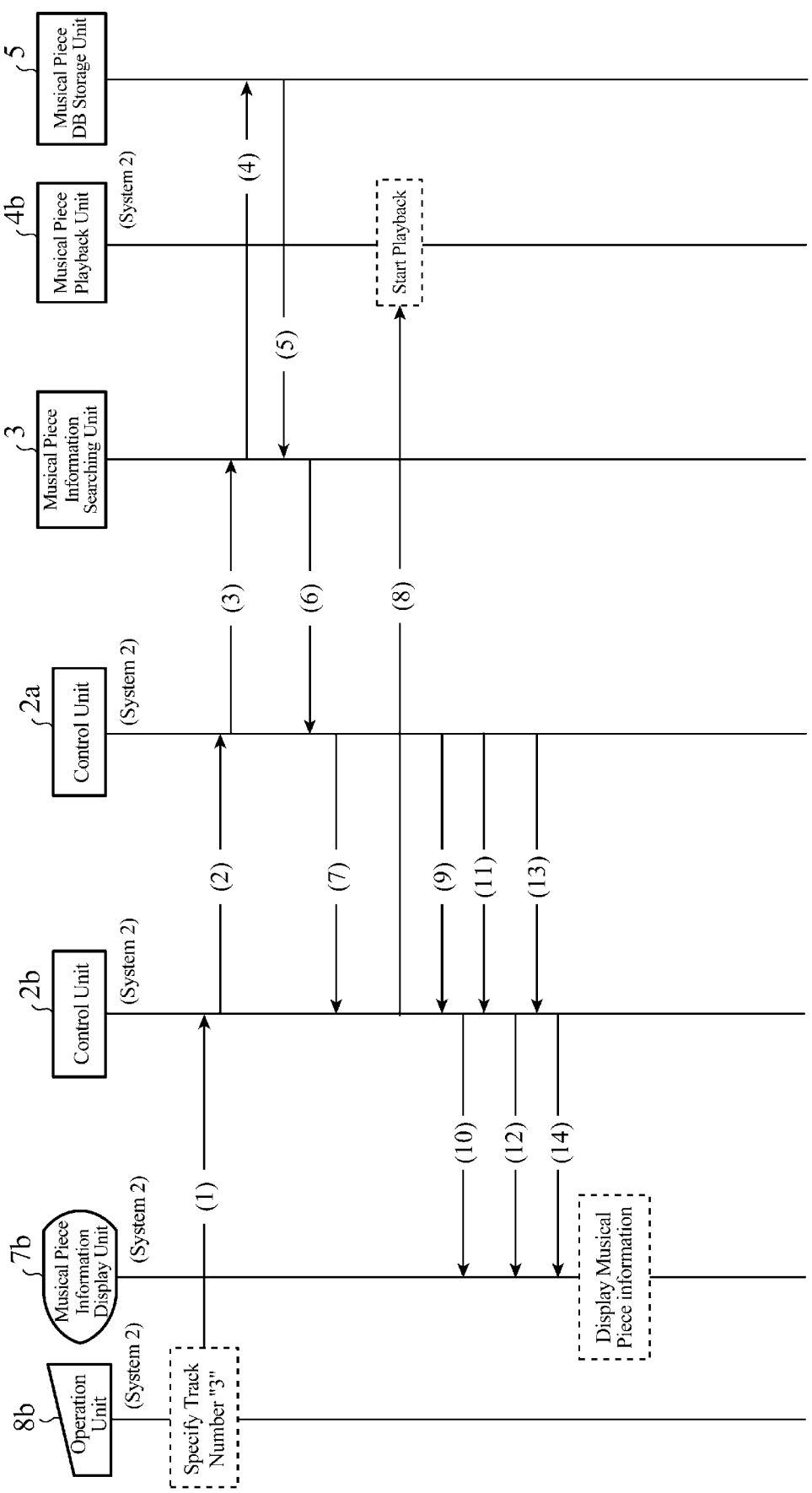
FIG. 3 is a timing chart of a musical piece playback of a system 2 in the in-vehicle media playback device in accordance with Embodiment 1.

FIG. 3 is a timing chart of the musical piece playback of the system 2 in the in-vehicle media playback device in accordance with Embodiment 1. In FIG. 3, a user specifies the track number "3" by using the operation unit 8*b* (1). Information about the operation of specifying the track number "3" is outputted from the operation unit 8*b* to the control unit 2*b*.

When receiving the above-mentioned operation information, the control unit 2*b* makes a request of the control unit 2*a* of the system (1) for individual transfers of the musical piece information corresponding to the track number "3" (2). At this time, the control unit 2*b* makes a request for an individual transfer of the musical piece data storage address among the pieces of item information of the musical piece information corresponding to the track number "3". The control unit 2*b* adds identification data for identifying the system to which the control unit belongs to data showing this request, and transmits the data.

When receiving the above-mentioned request, the request receiving unit 14*b* of the control unit 2*a* outputs this request to the transfer controlling unit 15. The transfer controlling unit 15 determines that the source of the request is the control unit 2*b* of the system 2 according to the identification data extracted from the data about the above-mentioned request, adds this identification data to the request data, and makes a request of the musical piece information searching unit 3 for a batch transfer of the musical piece information corresponding to the track number "3" (3).

The musical piece information searching unit 3 extracts the identification data from the above-mentioned request data received from the transfer controlling unit 15, and determines that the source of the request is the control unit 2*b* of the system 2 according to this identification data. The musical piece information searching unit 3 also searches through the musical piece DB storage unit 5 according to the track number "3" which has been requested. At this time, if the track number "3" matches the musical piece information of the record 3 of the musical piece DB storage unit 104, the musical piece information searching unit 3 accesses the record 3 of the musical piece DB storage unit 5 (4), and reads all the pieces of item information of the musical piece information stored in the record 3 and writes them into the buffer (not shown in FIG. 1) of the processor 0 (5).

Next, the musical piece information searching unit 3 reads the musical piece information stored in the above-mentioned buffer, adds the above-mentioned identification data to the musical piece information, and carries out a batch transfer of the musical piece information to the transfer controlling unit 15 of the control unit 2*a* (6). When receiving the musical piece information from the musical piece information searching unit 3, the transfer controlling unit 15 transfers this musical piece information to the determining unit 16. The determining unit 16 extracts the above-mentioned identification data from the musical piece information transferred thereto from the transfer controlling unit 15, and determines that the source of the request to transfer the musical piece information is the control unit 2*b* of the system 2 according to this identification data. The musical piece information which the determining unit 16 determines has been requested by the control unit 2*b* of the system 2 is sent from the determining unit 16 to the temporary storage unit 17, and is stored temporarily in the temporary storage unit.

When the musical piece data corresponding to the same musical piece information is being played back by the system 1, the musical piece information transmitting unit 18 reads each item information of the musical piece information from the temporary storage unit 17 at appropriate intervals in such a way that the reading of each item information at the intervals is consistent with the processing time required for the system 1 to display the musical piece information, and transfers each item information to the control unit 2*b* of the system 2.

At this time, in order to play back the musical piece data first, the musical piece information transmitting unit 18 reads the musical piece data storage address from the temporary storage unit 17, and performs an individual transfer of the musical piece data storage address to the control unit 2*b* (7).

The control unit 2*b* specifies the musical piece data storage address received from the musical piece information transmitting unit 18 of the control unit 2*a* for the musical piece playback unit 4*b* while issuing a playback start command (8). According to the playback start command, the musical piece playback unit 4*b* reads and decodes the corresponding musical piece data from the musical piece data storage unit 6 on the basis of the musical piece data storage address specified by the control unit 2*b*. The decoded musical piece data are outputted from the musical piece playback unit 4*b* to a DA conversion unit 10*b*.

The DA conversion unit 10*b* converts the data inputted from the musical piece playback unit 4*b* from a digital signal into an analog signal, and then outputs this analog signal to the amplifier 11*b*. The amplifier lib amplifies the analog signal of the inputted musical piece data, and outputs the amplified analog signal to the sound output unit 9*b*. As a result, an audio output of the musical piece data which the user has specified is produced via the sound output unit 9*b* and a playback of the musical piece data is started.

After that, the musical piece information transmitting unit 18 reads the "music name" information among the pieces of musical piece information from the temporary storage unit 17, and carries out an individual transfer of the music name information to the control unit 2*b* (9). The control unit 2*b* carries out an individual transfers of the "music name" information received from the musical piece information transmitting unit 18 of the control unit 2*a* to the musical piece information display unit 7*b* via the vehicle-mounted network 12 (10).

The musical piece information transmitting unit 18 then reads the "artist name" information among the pieces of item information of the musical piece information from the temporary storage unit 17, and carries out an individual transfer of the artist name information to the control unit 2b. The control unit 2b carries out an individual transfer of the "artist name" information received from the musical piece information transmitting unit 18 of the control unit 2a to the musical piece information display unit 7b via the vehicle-mounted network 12 (12).

The musical piece information transmitting unit 18 further reads the "genre name" information among the musical piece information from the temporary storage unit 17, and carries out an individual transfer of the genre name information to the control unit 2b (13). The control unit 2b carries out an individual transfer of the "genre name" information received from the musical piece information transmitting unit 18 of the control unit 2a to the musical piece information display unit 7b via the vehicle-mounted network 12 (14).

The musical piece information display unit 7b displays the character string information (the music name, the artist name and the genre name) of the musical piece information received from the control unit 2b on the screen.

Figure 4:
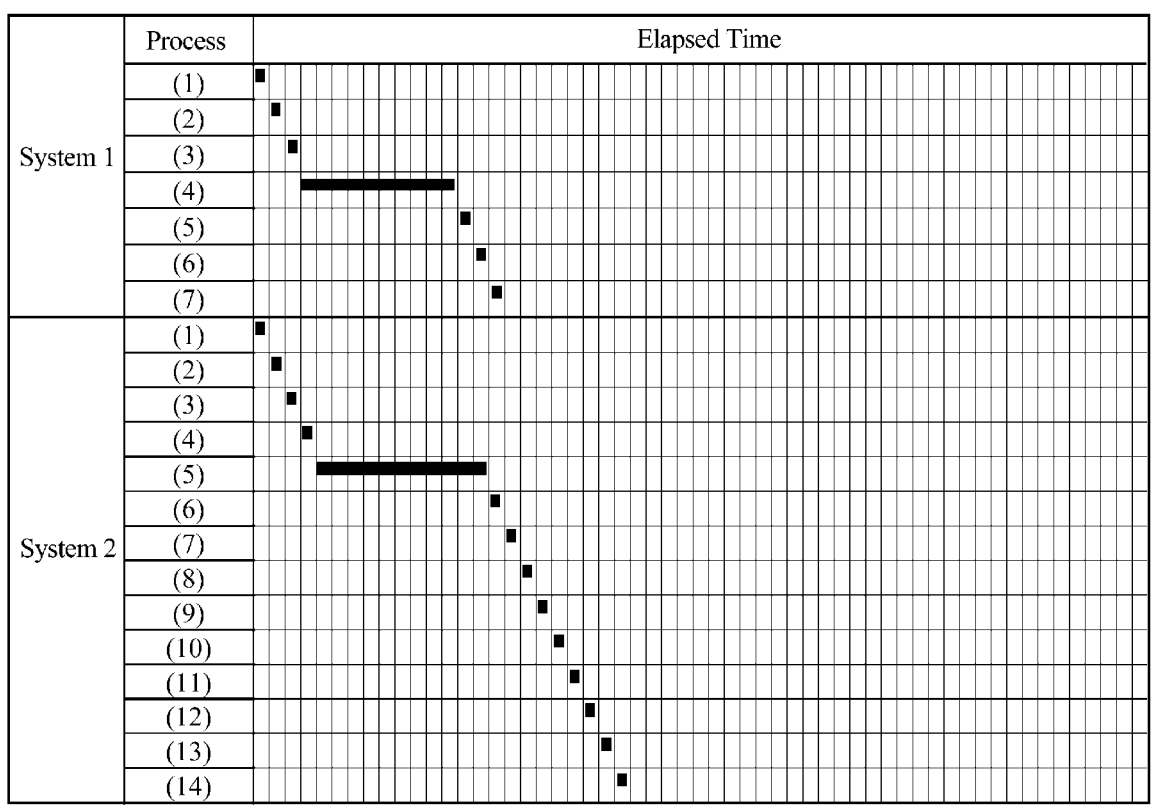
FIG. 4 is a view showing the details of the processing time required for a system 1 to carry out processing and that required for the system 2 to carry out processing in the in-vehicle media playback device in accordance with Embodiment 1.

FIG. 4 is a view showing the details of the processing time required for a system 1 to carry out the processing and that required for the system 2 to carry out the processing in the in-vehicle media playback device in accordance with Embodiment 1. Each processing time in FIG. 4 shows the time which has elapsed until corresponding musical piece information is displayed after the user has specified a track number. Furthermore, in order to compare the processing time of the system 1 with that of the system 2, the processing times shown in the figure are the ones of the systems 1 and 2 each of which is made to operate singly. Each scale of the elapsed time shown in FIG. 4 is equivalent to the transfer time required to transfer a single packet (transfer unit).

In the system 1, each of the process (1) of allowing the user to specify the track number "3", the process (2) of making a request for a batch transfer of the musical piece information which is performed by the control unit 2a, and the process (3) of accessing the musical piece DB storage unit 5 in response to the request which is performed by the musical piece information searching unit 3 is completed within a time period which is equal to the transfer time required to transfer a single packet in length.

In contrast, because data reading in the musical piece DB storage unit 5 involves a physical operation, the process (4) of reading the musical piece information corresponding to the track number "3" from the musical piece DB storage unit 5, and writing the musical piece information into the buffer, which is performed by the musical piece information searching unit 3, takes a long time.

Each of the process (5) of carrying out a batch transfer of the musical piece information corresponding to track number "3" to the control unit 2a, which is performed by the musical piece information searching unit 3, the process (6) of specifying the musical piece data storage address for the musical piece playback unit 4a, and issuing a playback start command, which is performed by the control unit 2a, and the process (7) of transferring the musical piece information to the musical piece information display unit 7a, which is performed by the control unit 2a, is completed within a time period which is equal to the transfer time required to transfer a single packet in length.

In the system 2, each of the process (1) of allowing the user to specify track number "3", the process (2) of making a request for the musical piece data storage address of the musical piece information, which is performed by the control unit 2b, the process (3) of making a request for a batch transfer of the musical piece information, which is performed by the control unit 2a, and the process (4) of accessing the musical piece DB storage unit 5 in response to the request, which is performed by the musical piece information searching unit 3, is completed within a time period which is equal to the transfer time required to transfer a single packet in length.

Also in the system 2, the process (5) of reading the musical piece information corresponding to the track number "3" from the musical piece DB storage unit 5, and writing the musical piece information into the buffer, which is performed by the musical piece information searching unit 3, takes a long time, like in the case of the system 1.

In contrast, each of the process (6) of carrying out a batch transfer of the musical piece information satisfying the request made by the control unit 2b to the control unit 2a, which is performed by the musical piece information searching unit 3, the process (7) of carrying out an individual transfer of the musical piece data storage address of the abovementioned musical piece information to the control unit 2b, which is performed by the control unit 2a, the process (8) of specifying the musical piece data storage address for the musical piece playback unit 4b, and issuing a playback start command, which is performed by the control unit 2b, the process (9) of carrying out an individual transfer of the "music name" information of the musical piece information to the control unit 2b, which is performed by the control unit 2a, the process (10) of carrying out an individual transfer of the "music name" information to the musical piece information display unit 7b, which is performed by the control unit 2b, the process (11) of carrying out an individual transfer of the "artist name" information of the musical piece information to the control unit 2b, which is performed by the control unit 2a, the process (12) of carrying out an individual transfer of the "artist name" information to the musical piece information display unit 7b, which is performed by the control unit 2b, the process (13) of carrying out an individual transfer of the "genre name" information of the musical piece information to the control unit 2b, which is performed by the control unit 2a, and the process (14) of carrying out an individual transfer of the "genre name" information to the musical piece information display unit 7b, which is performed by the control unit 2b, is completed within a time period which is equal to the transfer time required to transfer a single packet in length.

Figure 5:
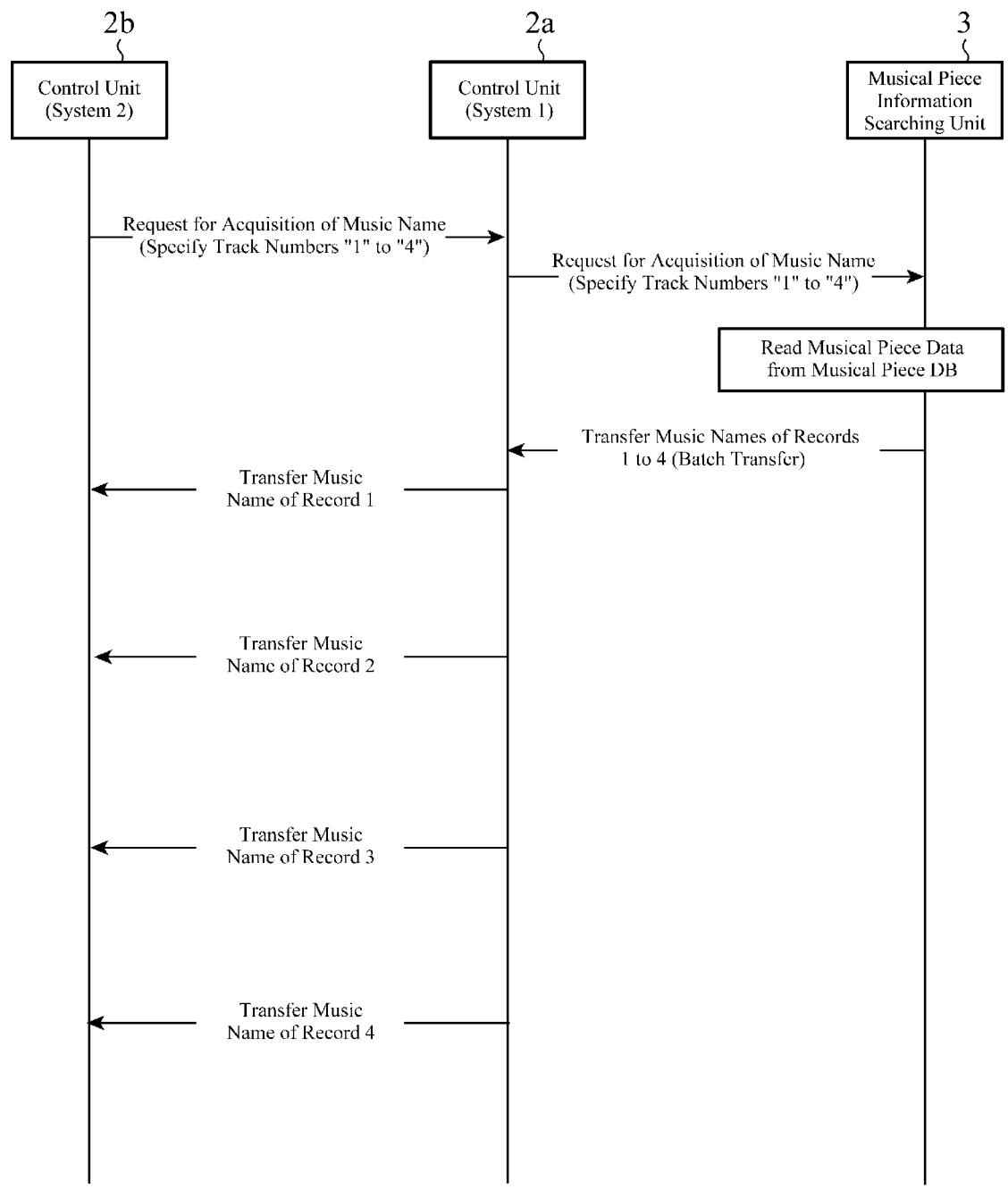
FIG. 5 is a timing chart of a process of displaying the music names of a plurality of musical piece data in the system 2 of the in-vehicle media playback device in accordance with Embodiment 1.
Figure 9:
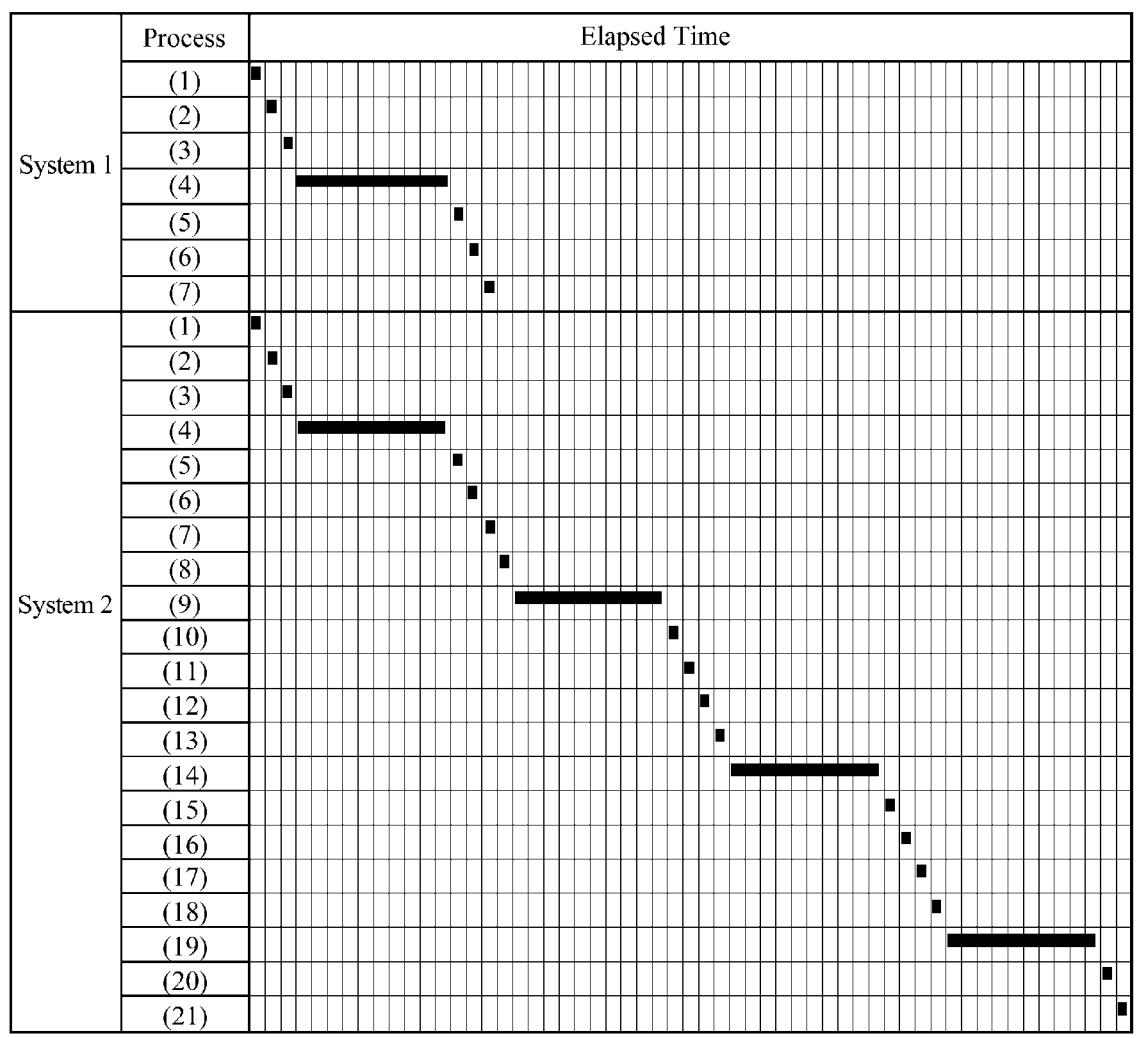
FIG. 9 is a view showing the details of the processing time required for the system 1 to carry out processing, and that required for the system 2 to carry out processing in the conventional in-vehicle media playback device.
Figure 10:
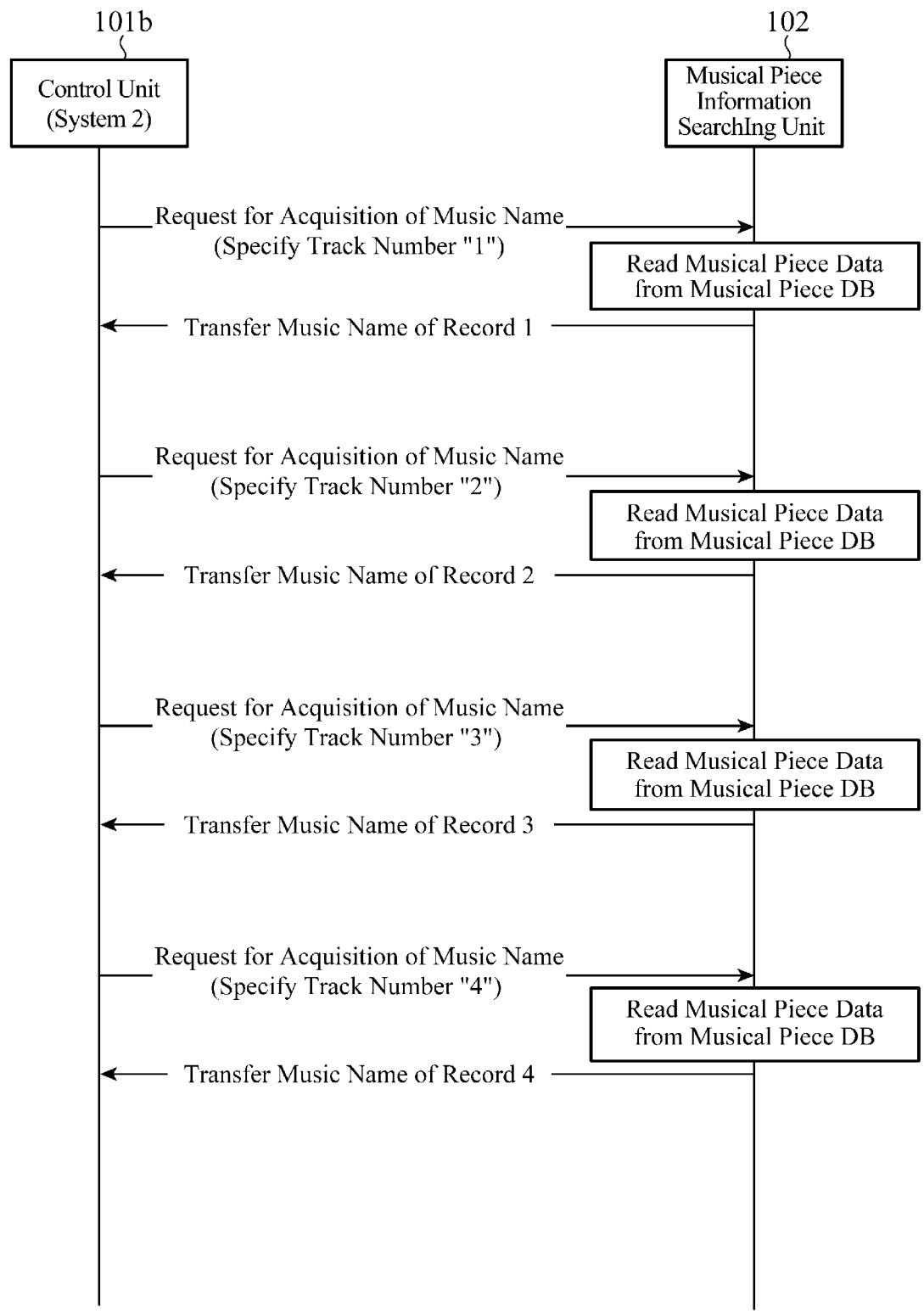
FIG. 10 is a timing chart of a process of displaying the music names of a plurality of musical piece data in the system 2 of the conventional in-vehicle media playback device.

Thus, because the in-vehicle media playback device in accordance with Embodiment 1 carries out even a transfer of a request for musical piece information from the control unit 2b of the system 2 and a transfer of the musical piece information acquired in response to the request via the control unit 2a of the system 1, the in-vehicle media playback device can complete each of the transfers by performing the process (4) of accessing the musical piece DB storage unit 5 only once without having to carry out the process two or more times, as shown in FIG. 5. Therefore, because the in-vehicle media playback device in accordance with this embodiment can complete each of the transfers by performing the process (5) of writing the musical piece information into the buffer only once, unlike the conventional device (refer to FIG. 9), the processing load can be reduced remarkably and the processing time can also be shortened greatly.

Furthermore, there is a case in which in the playback process of playing back a musical piece medium, a list of the music names of musical pieces playbackable the next time are displayed in addition to the music name of the musical piece currently being played back. Also in this case, in accordance with Embodiment 1, the processing load can be reduced and the processing time can be shortened in the same way as that mentioned above.

FIG. 5 is a timing chart of a process of displaying the music names of a plurality of musical piece data in the system 2 of the in-vehicle media playback device in accordance with Embodiment 1. As shown in FIG. 5, the control unit 2b of the system 2 makes a request of the control unit 2a of the system 1 to carry out an individual transfer of the "music name" information of each of the pieces of musical piece information corresponding to track numbers "1" to "4". The control unit 2a makes a request of the musical piece information searching unit 3 to carry out a batch transfer of the pieces of "music name" information of the pieces of musical piece information corresponding to the track numbers "1" to "4" in the above-mentioned way. When the pieces of musical piece information corresponding to the track numbers "1" to "4" which have been requested by the control unit 2a are stored in records 1 to 4 in the musical piece DB storage unit 5, respectively, the musical piece information searching unit 3 reads the "music name" information of each of the pieces of musical piece information stored in these records 1 to 4 from the musical piece DB storage unit 5, and carries out a batch transfer of the pieces of music name information to the control unit 2a. The control unit 2a stores the pieces of "music name" information which are transferred thereto in a batch in the temporary storage unit 17. After that, the control unit 2a sequentially reads the pieces of "music name" information stored in the records 1 to 4 from the temporary storage unit 17, and carries out an individual transfer of each of them to the control unit 2b. Thus, even when reading the pieces of "music name" information of a plurality of pieces of musical piece information, the in-vehicle media playback device can complete the reading process by performing the process of accessing the musical piece DB storage unit 5 only once, and by performing the process of writing the pieces of "music name" information of the records 1 to 4 into the buffer only once, the processing load can be reduced remarkably and the processing time can also be shortened greatly.

As mentioned above, in accordance with this Embodiment 1, the control unit 2a in the playback system 1, among the playback systems 1 and 2, which is connected to the musical piece searching unit 3 via the path (A) having the highest data transfer rate includes the request receiving unit 14b for receiving a request for musical piece information from the playback system 2, the determining unit 16 for discriminating between a request for musical piece information from the playback system to which the determining unit belongs (playback system 1) and the request for musical piece information from the playback system 2 which is received by the request receiving unit 14b, the temporary storage unit 17 for holding musical piece information which is acquired by the musical piece searching unit 3 in response to the request from the playback system 2, and the musical piece information transmitting unit for data-transferring the musical piece information satisfying the request from the playback system 2 which is read from the temporary storage unit 17 to the playback system 2 according to the data transfer rate of the path (D) connecting with the playback system 2, and each of the playback systems 1 and 2 makes a request of the musical piece searching unit 3 for musical piece information via the control unit 2a, and acquires the musical piece information satisfying the request. Thus, by carrying out a data transfer between the musical piece information searching unit and each system by selectively using only the route passing through the system 1 which is connected to the processor 0 having the musical piece information searching unit 3 via the path having the highest data transfer rate, the redundancy of the process of reading musical piece information from the musical piece DB storage unit 5 in the operation of reading the musical piece information resulting from an operational input to the system 2 can be improved, and the number of times that the musical piece information searching unit reads the musical piece information from the musical piece DB storage unit 5 can be minimized. Because the process of reading musical piece information from the musical piece DB storage unit 5 takes a long processing time per process, minimization of the number of times that this process is performed can reduce the load on the system and improve the operation delay. As a result, the system response ability is improved.

Furthermore, because any hardware change from the conventional typical structure hardly occurs, and what is necessary is just to add a small-scale change to the software processing of the control unit 2a, the increase in the cost required to apply the present invention to the in-vehicle media playback device can be reduced to a minimum.

Although in above-mentioned Embodiment 1 the case in which the in-vehicle media playback device has the two playback systems: the system 1 and the system 2 is shown, the in-vehicle media playback device can include three or more playback systems. In this case, by sending a request to search for musical piece information in each playback system and carrying out a transfer of musical piece information which is the request result by selectively using a route passing through a system connected to the processor 0 having the musical piece information searching unit 3 via a path having the highest data transfer rate, the same advantages as those mentioned above can be provided.

INDUSTRIAL APPLICABILITY

Because the in-vehicle media playback device in accordance with the present invention can improve its response ability to a user's operation of specifying a playback object, the in-vehicle media playback device is suitable for use as a playback device mounted in a vehicle, for playing back a music medium.

The invention claimed is:

1. An in-vehicle media playback system comprising:
a processor-based searching unit for searching for data information satisfying a request from a first storage unit for storing data information specifying media data; and
a first playback device and a second playback device each having:
   a playback unit for reading media data from a second storage unit for storing said media data according to said data information, and playing back said media data,
   a presenting unit for presenting data information about said media data, and
   a control unit for making a request of said processor-based searching unit for data information about media data which is a playback object,
wherein the control unit of the first playback device is connected to the second playback device,
wherein the second playback device includes a vehicle-mounted network which has a lower data transfer rate than a data transfer rate between the control unit and the presenting unit of the first playback system,
wherein the processor-based searching unit, the first playback device, and the second playback device are installed in the same vehicle,
wherein the control unit of the first playback device includes:

a receiving unit for receiving a request for data information from the second playback device;

a determining unit for discriminating between a request for data information from the first playback device, and the request for data information from the second playback device received by said receiving unit;

a data holding unit for holding data information acquired by said processor-based searching unit in response to the request from the second playback device; and a transmitting unit for data-transferring the data information satisfying the request from the second playback device which is read from said data holding unit to the second playback device according to the data transfer rate of the second playback device, and the control unit of the second playback device makes a request of said processor-based searching unit for data information via the control unit of the first playback device, and acquires data information satisfying the request via the control unit of the first playback device.

2. The in-vehicle media playback system according to claim 1, wherein the control unit of the first playback device performs the following:

acquires from the processor-based searching unit the data information satisfying the request from the second playback device in a batch, temporarily stores the data information satisfying the request from the second playback device in the data holding unit, and individually transfers the data information satisfying the request from the second playback device, to the second playback device.

3. The in-vehicle media playback system according to claim 1, wherein the control unit of the first playback device performs the following:

acquires, from the processor-based searching unit, data information satisfying each of the requests from the first and second playback devices in a batch, wherein the acquired data information satisfying each of the requests from the first and second playback devices includes a plurality of data items, transfers the acquired data information satisfying the request from the first playback device to the presenting unit of the first playback device in a batch, temporarily stores the acquired data information satisfying the request from the second playback device in the data holding unit, and individually transfers each of the data items in the acquired data information satisfying the request from the second playback device, to the second playback system.

4. An in-vehicle media playback system comprising:

a processor-based searching unit for searching for data information satisfying a request from a first storage unit for storing data information specifying media data; and a playback device having:

a playback unit for reading media data from a second storage unit for storing the media data according to the data information, and playing back the media data, a presenting unit for presenting data information about the media data, and a control unit for making a request of the processor-based searching unit for data information about media data which is a playback object, wherein the control unit of the playback device is connectable to an external playback device which includes a vehicle-mounted network having a lower data transfer rate than a transfer rate between the control unit and the presenting unit, wherein processor-based searching unit and the playback device are capable of being installed in the same vehicle as the external playback device, and wherein the control unit includes:

a receiving unit capable of receiving a request for data information from the external playback device to be forwarded to the processor-based searching unit;

a determining unit capable of discriminating between a request for data information from the playback device, and a request for data information from the external playback device received by the receiving unit;

a data holding unit capable of holding data information acquired by the processor-based searching unit in response to the request from the external playback device; and a transmitting unit capable of transferring the data information satisfying the request from the external playback device, which is read from the data holding unit, to the external playback device according to the data transfer rate of the external playback device.

5. The in-vehicle media playback system according to claim 4, wherein the control unit is capable of:

acquiring from the processor-based searching unit the data information satisfying the request from the external playback device in a batch, temporarily storing the data information satisfying the request from the external playback device in the data holding unit, and individually transferring the data information satisfying the request from the external playback device, to the external playback device.

6. The in-vehicle media playback system according to claim 4, wherein the control unit is capable of:

acquiring, from the processor-based searching unit, data information satisfying each of the requests from the playback device and the external playback device in a batch, wherein the acquired data information satisfying each of the requests from the playback device and the external playback device includes a plurality of data items, transferring the acquired data information satisfying the request from the playback device to the presenting unit in a batch, temporarily storing the acquired data information satisfying the request from the external playback device in the data holding unit, and individually transferring each of the data items in the acquired data information satisfying the request from the external playback device, to the external playback device.

* * * * *